2,920,090
PREPARATION OF METAL CYCLOPENTADIENIDE

Eddie G. Lindstrom and Maurice R. Barusch, Richmond, Calif., assignors to California Research Corporation, San Francisco, Calif., a corporation of Delaware No Drawing. Application July 13, 1953
Serial No. 367,714

4 Claims. (Cl. 260—429)

This invention relates to a class of unique organometallic compounds and a novel and universal method of preparing the same.

Subsequent to the recent preparation and discovery of iron biscyclopentadienyl, diligent research has been conducted in an effort to establish the structure of the compound in regard to its spatial configuration and electron bonding. The fact that this compound possessed such unique stability and reaction characteristics in contrast to other organometallic compounds and despite the presence of a conjugated diene structure in the molecule has occasioned considerable conjecture and structural hypotheses in explanation thereof. Numerous investigators have concluded, on the basis of accumulated physical evidence, that iron biscyclopentadienyl is a new type of organometallic compound which is characterized by a rare gas electron configuration and coordinate covalent bonding of the divalent iron atom. Predicated on this accepted structural hypothesis, investigators have predicted and allegedly verified that the only possible metal analogues are the ruthenium biscyclopentadienyl and osmium biscyclopentadienyl. In support of these postulations, experimental evidence has been reported to the effect that attempts to prepare other metal analogues have been unsuccessful.

Contrary to the accepted definition of the iron biscyclopentadienyl structure with its limitations on predictable analogues and in contrast with the reported unsuccessful attempts to prepare analogues other than the ruthenium compound, it has now been found possible to prepare and identify a series of new and unexpected metal cyclopentadienides. These achievements were attained by the discovery of a unique reaction process which may be applied universally to the preparation of this class of metal cyclopentadienides.

According to the present invention, divalent heavy metal cyclopentadienides may be prepared by the liquid phase reaction of an alkali or alkaline earth metal salt of cyclopentadiene or its substituted derivatives with an anhydrous divalent heavy metal salt when conducted in the presence of liquid ammonia or an N-organic base having an acid dissociation constant, as measured in an aqueous system, less than $1 \times 10^{-16}$. The broad application of the subject process appears to be primarily predicated on the type of reaction system employed, namely, anhydrous reactants and the particular nitrogen-containing bases as the inert liquid reaction medium. While certain theoretical aspects of the reaction mechanism remain in doubt, it has been found that the ultimate metathesis reaction is more easily adapted to the reaction with the divalent heavy metal salts of a heavy metal possessing a possible covalent coordination number of at least six.

In general, the temperatures of the reaction are not critical and depend to some extent upon the choice of the reaction medium employed. The reaction is conducted in the liquid phase so that the reaction temperatures should be maintained substantially below the boiling point of the reactants and the reaction medium. Pressure vessels may sometimes be employed to maintain the reactants and solvent in a liquid state. It is preferable to operate at a reasonably low temperature to avoid excessive polymerization and corresponding loss of the cyclopentadienide reactant. Although the reaction may be conducted at temperatures in the range of $-80°$ to $+200°$ C. the preferred range of operation is between $-80°$ and $+100°$ C.

The cyclopentadienide reactant may be described as an alkali or alkaline earth metal salt of cyclopentadiene or substituted derivatives thereof. In its preferred aspect, this reactant may be represented by the following structural formula

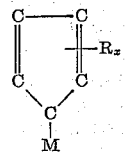

wherein M is an alkali or alkaline earth metal and preferably sodium, R is an aliphatic radical and preferably an alkyl radical, and $x$ is zero or an integer from 1 to 5. The alkali metal cyclopentadienide reactant may be prepared directly by formation of the alkali metal salt of the desired cyclopentadiene derivatives possessing an acidic hydrogen in the cyclopentadiene nucleus or cyclopentadiene may be reacted to form the alkali metal salt and the resulting alkali metal cyclopentadienyl reacted to incorporate the desired substituent groups.

The divalent heavy metal reactant may be presented in the form of a metal salt of an organic or inorganic compound containing a replaceable and acidic hydrogen provided the salt is introduced in a substantially anhydrous form. Examples of suitable metal compounds are the halides, sulfates, nitrates, acetates, acetonylacetates, formates and propionates, etc. As previously mentioned, the divalent form of a heavy metal possessing a possible covalent coordination number of at least six is preferred and of this class of heavy metals the metals of group IV-A and group VIII of the periodic organization of metals according to H. G. Deming, which possess a possible covalent coordination number of at least six are particularly preferred. The preferred form in which these metals are presented for reaction are in the form of the halides, acetates and formates. In some cases, as in the case of iron, the metal salt may be introduced in a higher valent form which, under the conditions of reaction, is reduced to the divalent form of the metal.

Of critical importance to the conduct of the process is the presence of the non-aqueous liquid reaction medium which, for the processes of the present invention, embodies liquid ammonia or an N-organic base having an acid dissociation constant, as measured in an aqueous system, less than $1 \times 10^{-16}$. These reaction media are necessarily substantially inert to the alkali metal cyclopentadienide reactant and should possess sufficient solvating power for the divalent heavy metal salt reactant. These liquid reaction media may generally include, besides the preferred liquid ammonia, compounds or mixtures thereof falling in the classes of the primary, secondary and tertiary aliphatic amines, primary and secondary aryl amines, primary, secondary and tertiary alkanol amines and n-heterocyclic compounds. Within the foregoing classes of N-organic bases, selection of the desired liquid reaction medium is dependent upon a number of specifications with respect to their physical and chemical properties. Thus, by definition, the N-organic bases should be liquid at the temperature and pressure at which the reaction is conducted. Additionally, the N-organic base should be substantially inert with respect to the alkali or alkaline earth metal cyclopentadienide reactant to prevent loss of the reactant and formation of by-products. Further, an appreciable solvating power for the anhydrous metal salt is desirable and it is preferred to select an N-organic base which is capable of forming comparatively labile coordination compounds or complexes with the metal salt reactant.

The preparation of the alkali or alkaline earth cyclopentadienide reactant may also be conducted in the presence of liquid ammonia or the afore-described N-organic base, and thereby facilitating the materials' handling and minimizing the reaction variables in the process system. Thus, cyclopentadiene, its aliphatic substituted derivatives, or compounds containing a cyclopentadiene nucleus with an acidic hydrogen in the cyclopentadiene nucleus, may be reacted directly with an ionic solution of the desired alkali or alkaline earth metal in liquid ammonia or a liquid N-organic base. Additionally, instead of the elemental metal, compounds of the desired alkali or alkaline earth metal with a weak acid-reacting compound may be used in solution with the liquid ammonia or the liquid N-organic base reaction medium. Illustrative of such compounds are the alkali metal carbohydrides such as the alkyls, aryls, acetylides, etc., the metal alcoholates and the amides. Particularly preferred as the basic reactants, are the alkali metal amides and especially sodium amide employed in the presence of liquid ammonia.

The final heavy metal cyclopentadienide may be recovered from the reaction system by a number of conventional methods depending upon the physical characteristics and stability of the product. Within the foregoing class of metal cyclopentadienides prepared in accordance with the subject process, the products will range from solid to liquid, and very reactive to extremely unreactive. The metal cyclopentadienides in the category of highly reactive are extremely susceptible to the presence of oxygen and decompose even by using stable oxygen-containing solvents. The solid products, such as substantially all of the metal biscyclopentadienyls and the lower alkyl-substituted derivatives, may be sublimed from the reaction mix after removal of the reaction medium and the liquid products, such as the higher aliphatic derivatives, may be purified and recovered by distillation. Solvent extraction may also be employed or the metathesis reaction process may be conducted in the presence of a product solvent which is immiscible with the liquid reaction medium. Examples of the latter may be hydrocarbon solvents such as petroleum hexanes or the aromatic solvents such as toluene, when employed in a liquid ammonia system.

The following examples are presented by way of illustrating the unique aspects of the subject reaction process and are not to be construed as limitations thereof.

*Example 1*

11.5 grams (0.5 gram atom) of sodium metal were added to about 300 cc. of liquid ammonia containing 0.2 gram of ferric nitrate nonahydrate in a half-liter reaction flask equipped with a reflux condenser and means for agitation. The resulting sodium amide was allowed to remain in the reaction flask together with the excess ammonia and maintained at reduced temperature with a solid carbon dioxide-acetone coolant in the condenser and surrounding the flask. 33 grams (0.5 gram mol) of cyclopentadiene monomer were then added dropwise to the sodium amide-liquid ammonia mixture at such a rate as not to exceed the capacity of the condenser. There was considerable heat evolution and ammonia disengagement, and the sodium amide-ammonia slurry changed color from gray to green. The formation of sodium cyclopentadienyl was indicated by the disappearance of the slightly soluble sodium amide.

In a separate operation, $NiCl_2 \cdot 6H_2O$ was dehydrated by heating to about 160° C. at 5 mm. absolute pressure for a sufficient time to disengage the theoretical quantity of water. 32 grams (0.25 gram mol) of the anhydrous nickelous chloride were then added to the cooled reaction flask containing sodium cyclopentadienyl in liquid ammonia over about a 10 minute period. Considerable heat evolution was observed during the addition. The mixture was stirred for 2 hours at approximately −33° C., and thereafter the coolant was removed and the ammonia allowed to evaporate overnight. 110 grams of residue, consisting of sodium chloride nickel biscyclopentadienyl, together with residual ammonia, were obtained. An aliquot of the residue was extracted five times with 200 portions of straight-run petroleum-mixed hexanes. The filtered hexane solution was evaporated to dryness at a final pressure of 5 mm. absolute. The distillate had a pale green color indicating small loss of product. The residue from the hexane extraction was then sublimed under 2 mm. absolute pressure at the temperature of boiling water under an ice-cooled cold finger in the vapor phase. Resulting yields of deep green sublimed crystals, when prorated with the nickelous chloride charge, corresponded to a yield of 3 weight percent of theoretical.

An analysis of the resulting nickel biscyclopentadienyl indicated the following:

| Weight, Percent | Theoretical | Found | |
|---|---|---|---|
| Carbon | 63.56 | 63.60 | 63.71 |
| Hydrogen | 5.34 | 5.24 | 5.39 |
| Nickel | 31.10 | 30.31 | 30.21 |

*Example 2*

To 1 gram mol of sodium cyclopentadienyl in about 300 ml. of liquid ammonia maintained at approximately −33° C. by a solid carbon dioxide-acetone coolant was added 0.5 gram mol of anhydrous ferrous chloride over a period of about 10 minutes. The coolant was removed from the reaction flask and the liquid ammonia allowed to evaporate overnight. 100 ml. of absolute alcohol were added to the residue followed by 200 ml. of water and 150 ml. of concentrated hydrochloric acid. After stirring for about 2 hours, the crude product was filtered off and water washed. The filtrate and washings were colored blue. The cooled product was then dissolved in carbon tetrachloride and filtered free of by-product residue. The carbon tetrachloride was evaporated off the filtrate and the product dried by heating in a water bath at 50° C. under 5 mm. absolute pressure. 48 grams of small orange crystals were obtained equivalent to a yield of 51.5 mol percent. The original blue filtrate was reduced with stannous chloride yielding a flocculent canary-yellow precipitate. The latter was filtered, washed with water, and dried by heating at 60° C. under 5 mm. pressure, bringing the total yield to 65 mol percent.

The resulting iron biscyclopentadienyl recovered was analyzed as follows:

| Weight, Percent | Theoretical | Found | |
|---|---|---|---|
| Carbon | 64.57 | 64.75 | 64.75 |
| Hydrogen | 5.42 | 5.31 | 5.47 |
| Iron | 30.03 | 29.76 | 29.64 |

*Example 3*

60 grams (0.25 mol) of $CoCl_2 \cdot 6H_2O$ were dehydrated by heating at 160° C. at 5 mm. pressure. The anhydrous cobaltous chloride so obtained was added slowly over a period of 15 minutes to a solution of 0.5 mol of sodium cyclopentadienyl in liquid ammonia while cooling in a solid carbon dioxide-acetone bath. A cream-yellow slurry resulted which was stirred at the boiling point for two hours. Cooling was discontinued and the ammonia allowed to evaporate. After evaporation, 95 grams of an orange-tan granular residue were obtained. 45 grams of the residue were heated in a 95° C. water bath at 7 mm. pressure for 3 hours, resulting in the recovery of a mass of blue-black crystals.

Combustion analyses on the cobalt biscyclopentadienyl are as follows:

| Weight, Percent | Theoretical | Found |
|---|---|---|
| Carbon | 63.51 | 58.81 |
| Hydrogen | 5.33 | 5.61 |

An X-ray powder defraction pattern of the cobalt biscyclopentadienyl crystals resulted in the following characteristic interplanar spacings or lines:

Spacings in angstroms—
5.91[1]
5.11[1]
4.7
4.07

[1] Intensity strong or very strong.

An additional 20 grams of the reaction product were heated in a 95° C. water bath under a water-cooled cold finger at 3 mm. pressure. 0.22 gram of blue-black crystalline sublimate was obtained in the first 6 hours, 0.16 gram in the next 8 hours, and an additional small quantity by continued heating.

The sublimate consisted of isolated blue-black crystals on the cold finger surrounded by halos of dark purple. The solid carbon dioxide-cooled cold trap used in the sublimations contained royal blue crystals. Cobalt biscyclopentadienyl dissolved in carbon disulfide with evidence of reaction and decomposition. A blue-black solution resulted which was deep blue with a purple cast in thin sections. The carbon disulfide solution turned yellowish-brown rapidly on exposure to air. This compound reacted with carbon tetrachloride giving a brown-orange solution.

The infra-red absorption spectrum on solutions in carbon disulfide and carbon tetrachloride indicates substantially identical structure with iron biscyclopentadienyl. The absorption peaks observed were as follows:

Wave length in microns—
12.85
10.0
9.5
9.0
7.05
3.2

*Example 4*

42 grams (0.22 mol) of anhydrous stannous chloride were added to 0.5 mol of sodium cyclopentadienyl in liquid ammonia with stirring over a period of 10 minutes while cooling in a solid carbon dioxide-acetone bath. The yellow slurry which resulted was refluxed for 2 hours and the cooling bath removed, allowing the ammonia to evaporate. 92.5 grams of reaction product were obtained. 90 grams were charged to a sublimation apparatus and the product was sublimed onto a water-cooled cold finger at 3 mm. pressure. Sublimation from the granular reaction product was moderately rapid at 100° C. oil bath temperature and quite rapid at 150° C. The crystalline sublimate was white with a faint-yellow tinge. A total of 32.3 grams of sublimed tin biscyclopentadienyl were obtained, representing a yield of 52%. The product turned yellow on exposure to air, and gradually acquired a reddish-orange color on storage under nitrogen.

The analysis of the resulting tin biscyclopentadienyl is as follows:

| Weight, Percent | Theoretical | Found | |
|---|---|---|---|
| Carbon | 48.25 | 47.68 | 47.66 |
| Hydrogen | 4.05 | 3.98 | 4.01 |
| Tin | 47.69 | 45.8 | 46.2 |

The low values for the analytical results are believed due to oxidation which occurred during preparation of the sample for analysis. The compound did not have a definite melting point in a sealed capillary. It turned orange at about 92° C., appeared to dampen or partially liquefy at about 106° C., turned red-brown at about 158° C., brown at 185° C., and decomposed to a black mass at 213° C.

The infra-red absorption spectra showed the following peaks characteristic of the foregoing metal biscyclopentadienyl compounds. The absorption peaks observed were as follows.

Wave length in microns—
13.18
12.97
9.90
9.50
8.95
6.97
3.2

Tin biscyclopentadienyl is slightly soluble in ethyl ether, ethanol, light petroleum, ether, acetone, toluene, chloroform, and carbon tetrachloride. However, a gelatinous precipitate forms in these solutions on short standing. The reddish-orange precipitate forms rapidly in carbon disulfide solution. The original reaction product and the sublimation residue in the above preparation were pyrophoric.

*Example 5*

To 0.5 mol of sodium cyclophentadienyl in liquid ammonia, 70 grams (0.025 mol) of plumbous chloride were added while cooling the reaction mixture in a solid carbon dioxide-acetone bath. A light-green slurry resulted. The reaction mixture was stirred for 3 hours at its boiling point whereupon the coolant was removed and the ammonia allowed to evaporate. 119.5 grams of a yellow, brown and gray solid reaction product mixture were obtained. An aliquot portion of this granular reaction product was sublimed at 3 mm. pressure under a water-cooled cold finger in a 95–100° C. bath. Sublimation of canary-yellow crystals occurred at a slow rate. The sublimation rate was rapid in a 150° C. oil bath. The yield was 55%.

The following analyses were obtained on the yellow crystalline sublimate verifying the formation of lead biscyclopentadienyl:

| Weight, Percent | Theoretical | Found | |
|---|---|---|---|
| Carbon | 35.60 | 35.83 | 35.82 |
| Hydrogen | 2.99 | 3.08 | 3.17 |
| Lead | 61.41 | 61.00 | 61.07 |

The yellow crystals of lead biscyclopentadienyl melt at 132–135° C.

The infra-red absorption spectrum indicates the analogy in structure with the preceding metal biscyclopentadienyl compounds. The observed absorption peaks are as follows:

Wave length in microns—
13.25
9.90
9.50
8.95
6.97
3.2

The X-ray powder defraction indicated the following characteristics:

Spacings in angstroms—
10.6
8.3
7.2
6.6 [1]
6.3
6.1
5.7 [1]
5.4 [1]
5.3 [1]
4.9
4.5
4.44
4.19
4.01
3.90
3.59
3.27

[1] Intensity strong or very strong.

The lead biscyclopentadienyl turned brown in air after a few minutes' exposure. However, the compound is stable under nitrogen. It dissolved readily in benzene and slowly in a mixed hexane solvent or heptane-iso-octane mixtures, resulting in light-yellow solutions. After a few minutes, these solutions began to form a yellow-white gelatinous precipitate. Solutions of lead biscyclopentadienyl in heptane-iso-octane required several days for complete loss of the yellow color when stored under nitrogen.

*Example 6*

To 0.5 gram mol of sodium cyclopentadienyl in liquid ammonia, 34 grams (0.25 gram mol) of anhydrous cupric chloride were added over a period of 10 minutes while cooling in a solid carbon dioxide-acetone bath. The cupric chloride turned blue from the ammonia vapor. The reaction mixture was dark olive-green at first, and changed to a dark blue-black color in about one-half hour. After stirring for 2 hours at the boiling point, the ammonia was allowed to evaporate. 72.1 grams of a reaction product mixture were obtained. This reaction residue was dark purple, with black, gray and blue colors at the edges. An aliquot portion was sublimed at 3 mm. pressure under a water-cooled cold finger. Bath temperatures at 50–100° C. were found to be most suitable since higher temperatures appear to reduce the quantity of sublimate. Small quantities of a yellow-green crystalline sublimate were obtained. This sublimate was readily soluble in hydrocarbon solvents, such as the petroleum-mixed hexanes, to give a pale greenish-yellow solution.

*Example 7*

18.4 grams (0.8 mols) of sodium metal was melted and converted to a sodium sand by vigorous stirring in boiling toluene. The sodium sand was washed twice with dry ether. 900 ml. of dry ether and 53 grams (0.8 mol) of cyclopentadiene were then added. The reaction and evolution of the hydrogen was vigorous. The ether was condensed and returned to the system with a solid carbon dioxide cooled condenser. Cooling of the reaction vessel itself was also necessary in the early part of the reaction. The reaction mixture rapidly changed to a thick, white paste of solid sodium cyclopentadienyl suspended in ether. The reaction was substantially complete in an hour although a slow evolution of hydrogen continued for two to three hours.

Separately 58 grams (0.44 mol) of anhydrous nickelous chloride was solvated with pyridine by refluxing for one hour in 350 ml. of pyridine. The resulting slurry of nickel chloride in pyridine was cooled and added to the sodium cyclopentadienyl in ether suspension at room temperature. A deep green solution with some undissolved green solid resulted. This green solution turned purple brown on exposure to air. After 10 minutes of stirring the reaction mixture was quenched with water. The product was diluted with 1 liter of petroleum-mixed hexanes and 2 liters of water. The aqueous phase which was green due to excess nickel chloride was settled and discarded. The organic phase had a deep green color and was no longer rapidly oxidized by air. It was given two water washes, two dilute hydrochloric acid washes and a final water wash to completely remove pyridine and unreacted nickel chloride. These washes were brownish-yellow in color. The product was filtered and the solvents removed by vacuum distillation. 54.5 grams (72% yield based on sodium and cyclopentadiene) of clean, dry, crystalline nickel biscyclopentadienyl was obtained. 97% of this product sublimed at two mm. pressure in a 90° C. bath. The sublimate had an equivalent weight of 98 determined by titration in 50% alcohol with 0.1 N HCl. The theoretical equivalent weight of nickel biscyclopentadienyl is 95.

*Example 8*

Sodium cyclopentadienyl was prepared as in the previous example from 5.6 grams of sodium, 15.5 grams of cyclopentadiene in 300 ml. of ether. 150 ml. of benzene was added and the ether was removed by distillation to an overhead vapor temperature of 74° C. At this point the reaction mixture was a brown powder suspended in dark brown solvent, the color being caused by some exposure to air. 50 grams of acetonitrile was added and the mixture refluxed for 4 hours with estimated pot temperature of 80° C. After standing overnight, a slurry of 15 grams of nickelous chloride solvated in 100 ml. of pyridine was added. The product was worked up as in the previous example and 12.8 grams of nickel biscyclopentadienyl (57% yield based on cyclopentadiene) was obtained.

*Example 9*

246 grams (2 mols) of normal propyl bromide was added dropwise to 2 mols of sodium cyclopentadienyl in 600 ml. of ammonia while cooling in a solid carbon dioxide bath. The residue obtained after evaporation of ammonia was taken up in 2 N HCl. The aqueous phase was discarded. 30 grams of a solid plastic polymeric material was filtered from the organic phase. 165 grams of a dark amber liquid product was obtained which contained practically no monomeric cyclopentadiene or propylcyclopentadiene. 162 ml. of this product was charged to a three-foot, one-half inch spinning band column and fractionated at 1 mm. pressure and a 10:1 reflux ratio. 86 ml. was collected on a distillation plateau of 88°–91° C. Analyses identified this product as propylcyclopentadiene dimer ($D_4^{20}$ 0.9222 and $N_{20}^D$ 1.5005). This n-propylcyclopentadiene dimer was depolymerized by heating at 260°–290° C. The reflux was returned to the pot from a seven-inch Friedrich's condenser operated without coolant and the monomer was taken overhead.

The sodium salt of the propyl cyclopentadiene was prepared in the usual manner by the reaction of 5 grams of sodium amide in liquid ammonia and 17.6 grams of the propylcyclopentadiene. The methathesis reaction was conducted by reacting 13 grams of nickel chloride with the resulting solution of the sodium propylcyclopentadienyl in liquid ammonia. The resulting nickel bispropylcyclopentadienyl was extracted with petroleum-mixed hexanes after evaporation of the ammonia. 16.9 grams of a dark-green liquid was obtained which turned yellow-brown rapidly on exposure to air. The equivalent weight was determined by a solution in equal parts of alcohol and 0.1 N HCl and back-titrating the excess acid. The equivalent weight obtained was 165 against the calculated equivalent weight of 147. The product crystallized from a mixed-hexane solution on cooling in a solid carbon dioxide bath but the melting point of the crystals was below 0° C. The nickel bispropylcyclopentadienyl appeared to be more reactive than the nickel biscyclopentadienyl.

*Example 10* t-Butylcyclopentadiene was prepared in a manner analogous to the preceding preparation of propylcyclopentadiene, employing 0.2 mol of sodium cyclopentadienyl in 300 ml. of ammonia and 0.25 mol of t-butyl bromide. The resulting t-butylcyclopentadiene was reacted with 6.6 grams of sodium amide in 300 ml. ammonia to prepare the sodium t-butylcyclopentadienyl which was thereafter reacted with 15 grams of nickelous chloride. The product was extracted with petroleum-mixed hexanes and 3+ grams of dark-green crystals in conjunction with some yellow-brown liquid was obtained. The resulting nickel bis-t-butylcyclopentadienyl possessed a reactivity comparable to that of nickel biscyclopentadienyl.

*Example 11*

Sodium methylcyclopentadienyl was prepared according to the method of the preceding examples from the reaction of 11.5 grams of sodium and 35.6 grams (0.45 mol) of methylcyclopentadiene in 300 ml. of liquid ammonia. The methylcyclopentadiene employed was obtained from a mixture of cyclopentadiene and methylcyclopentadiene accompanied by other unsaturated hydrocarbons as found in a narrow boiling fraction derived from petroleum. The methylcyclopentadiene was separated by polymerization, depolymerization and vacuum distillation. The sodium methylcyclopentadiene solution in liquid ammonia was reacted with 32.5 grams (0.22 mol) of anhydrous nickelous chloride and after evaporation of the ammonia, one-fourth of the residue was subjected to sublimation. The first sublimation was conducted at 3 mm. pressure in a 60°–90° C. bath onto a carbon dioxide-cooled cold finger. A moist solid was obtained which was resublimed at 2 mm. pressure in a 50°–80° C. bath onto a water-cooled finger. 4.8 grams of dark-green crystals were obtained which melted sharply at 39.8° C. without decomposition. Combustion analysis of the resulting nickel bismethylcyclopentadienyl were as follows:

| Weight, Percent | Theoretical | Found | |
|---|---|---|---|
| Carbon | 66.44 | 66.84 | 66.90 |
| Hydrogen | 6.51 | 7.04 | 7.12 |

The remaining ammonia evaporation residue was extracted with petroleum-mixed hexanes and 19 grams of nickel bismethylcyclopentadienyl was obtained. This product was crystallized from 50 ml. of isooctane by cooling in solid carbon dioxide. The analysis obtained indicated a weight percent nickel of 26.0, 26.1 against a theoretical value of 27.06.

In addition to the foregoing illustrative examples, numerous experiments have been conducted employing variations in the composition of the inert liquid reaction medium as well as modifications in the composition of the metathesis reactants within the scope of the reaction process as described and claimed. It was ascertained that the cyclopentadienide reactant may be presented in the form of an alkali or alkaline earth metal salt of cyclopentadiene and its organic or inorganic substituted derivatives and the divalent heavy metal reactant may be presented in the form of the anhydrous organic or inorganic salts. The type of divalent heavy metal salt employed may depend, to a large extent, upon the particular liquid reaction medium used. Although liquid ammonia is the preferred reaction medium, other reaction media may be used within the scope of the N-organic bases having an acid dissociation constant less than $1 \times 10^{-16}$ and for the preparation of certain specific metal cyclopentadienides some of these other reaction media may be preferred.

Obviously many modifications and variations of the invention as hereinabove set forth may be made without departing from the spirit and scope thereof, and only such limitations should be imposed as are indicated in the appended claims.

We claim:

1. A process for the preparation of a heavy metal cyclopentadienide of a metal having a possible covalent coordination number of at least six which comprises the liquid phase reaction of a compound of the following structural formula

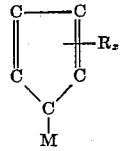

in which M is an alkali metal, R is an aliphatic hydrocarbon radical and $x$ is selected from the group consisting of zero and integers from 1 to 5, with an anhydrous salt of a metal possessing a possible covalent coordination number of at least six in the presence of a non-aqueous liquid reaction medium selected from the group consisting of ammonia and an N-organic base having an acid dissociation constant as measured in an aqueous system of less than $1 \times 10^{-16}$.

2. A process for the production of a divalent heavy metal biscyclopentadienyl which comprises reacting in the liquid phase an alkali metal cyclopentadienyl with an anhydrous divalent heavy metal salt in the presence of a non-aqueous liquid reaction medium selected from the group consisting of ammonia and an N-organic base having an acid dissociation constant of less than $1 \times 10^{-16}$.

3. A process for the preparation of a metal biscyclopentadienyl of a metal from groups IV–A and VIII of the periodic system according to H. G. Deming which possesses a possible covalent coordination number of at least six which comprises reacting in the liquid phase an alkali metal cyclopentadienyl with an anhydrous salt of a metal selected from the class consisting of said groups IV–A and VIII and possessing a possible coordination number of at least six in the presence of a nonaqueous liquid reaction medium selected from the group consisting of ammonia and an N-organic base having an acid dissociation constant of less than $1 \times 10^{-16}$.

4. A process for the preparation of a metal biscyclopentadienyl of a metal from groups IV–A and VIII of the periodic system according to H. G. Deming which possesses a possible covalent coordination number of at least six which comprises reacting in the liquid phase an alkali metal cyclopentadienyl with an anhydrous halide of a metal selected from the class consisting of said groups IV–A and VIII and possessing a possible coordination number of at least six in the presence of a non-aqueous liquid reaction medium selected from the group consisting of ammonia and an N-organic base having an acid dissociation constant of less than $1 \times 10^{-16}$.

References Cited in the file of this patent

Wilkinson: J. Am. Chem. Soc., vol. 74, p. 6148, December 5, 1952.

Page et al.: J. Am. Chem. Coc., vol. 74, pp. 6149–6150, December 5, 1952.

Fischer et al.: Zeitschrift für Naturforschung, vol. 8B, #5, May 1953, pp. 217–219.

Wilkinson et al.: J. Am. Chem. Soc., vol. 75, February 20, 1953, pp. 1011, 1012.

UNITED STATES PATENT OFFICE
CERTIFICATE OF CORRECTION

Patent No. 2,920,090                          January 5, 1960

Eddie G. Lindstrom et al.

It is hereby certified that error appears in the printed specification of the above numbered patent requiring correction and that the said Letters Patent should read as corrected below.

Column 4, line 21, for "of 3 weight" read -- of 37 weight --; column 6, line 38, for "cyclophentadienyl" read -- cyclopentadienyl --.

Signed and sealed this 14th day of June 1960.

(SEAL)
Attest:

KARL H. AXLINE
Attesting Officer

ROBERT C. WATSON
Commissioner of Patents